United States Patent
Honda et al.

(10) Patent No.: US 11,618,437 B2
(45) Date of Patent: Apr. 4, 2023

(54) CONTROL APPARATUS OF POWER TRANSMISSION SYSTEM FOR VEHICLE

(71) Applicant: TOYOTA JIDOSHA KABUSHIKI KAISHA, Toyota (JP)

(72) Inventors: Hiroyasu Honda, Toyota (JP); Ryosuke Saito, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 326 days.

(21) Appl. No.: 17/062,780

(22) Filed: Oct. 5, 2020

(65) Prior Publication Data

US 2021/0179074 A1 Jun. 17, 2021

(30) Foreign Application Priority Data

Dec. 12, 2019 (JP) .............................. JP2019-224932

(51) Int. Cl.
*B60W 30/06* (2006.01)
*B60W 10/11* (2012.01)

(52) U.S. Cl.
CPC ............ *B60W 30/06* (2013.01); *B60W 10/11* (2013.01); *B60W 2510/0208* (2013.01); *B60W 2510/105* (2013.01)

(58) Field of Classification Search
CPC ............... B60W 30/06; B60W 10/11; B60W 2510/0208; B60W 2510/105; B60W 30/182; F16H 63/3416
USPC ........................................................ 701/41
See application file for complete search history.

(56) References Cited

U.S. PATENT DOCUMENTS

| | | | | |
|---|---|---|---|---|
| 4,711,141 A | * | 12/1987 | Speranza | B60W 30/19 701/68 |
| 5,971,887 A | | 10/1999 | Hattori et al. | |
| 2010/0151988 A1 | * | 6/2010 | Tabata | B60K 6/445 318/434 |
| 2015/0087463 A1 | * | 3/2015 | Nakagawa | F16H 37/022 475/201 |
| 2016/0258531 A1 | * | 9/2016 | Ito | F16H 61/662 |
| 2016/0369856 A1 | * | 12/2016 | Kimura | F16D 48/062 |
| 2017/0037965 A1 | * | 2/2017 | Inoue | F16H 61/66259 |
| 2017/0129485 A1 | * | 5/2017 | Seo | B62D 15/0285 |
| 2017/0159729 A1 | * | 6/2017 | Sakamoto | F16D 48/066 |
| 2017/0241492 A1 | * | 8/2017 | Matsuo | F16H 61/30 |

(Continued)

FOREIGN PATENT DOCUMENTS

| | | | | |
|---|---|---|---|---|
| DE | 102021101869 A1 | * | 9/2021 | ............ B60W 10/06 |
| JP | H10-115357 A | | 5/1998 | |

(Continued)

*Primary Examiner* — B M M Hannan
(74) *Attorney, Agent, or Firm* — Oliff PLC

(57) ABSTRACT

A control apparatus of a power transmission system for a vehicle calculates estimated driving force while taking account of inertia loss torque and a transmission efficiency, during execution of automatic parking control for automatically parking the vehicle at a target parking position. During execution of automatic parking control, the control apparatus sets a traveling mode to a gear traveling mode in which power is transmitted via a gear mechanism, or sets the traveling mode to a belt traveling mode in which power is transmitted via a stepless speed change mechanism, and fixes the speed ratio of the stepless speed change mechanism to the lowest-side speed ratio.

5 Claims, 3 Drawing Sheets

(56) References Cited

U.S. PATENT DOCUMENTS

| | | | |
|---|---|---|---|
| 2017/0314672 A1* | 11/2017 | Inoue | F16H 61/0403 |
| 2017/0350500 A1* | 12/2017 | Inagaki | F16H 61/12 |
| 2018/0010687 A1* | 1/2018 | Moritomo | F16H 37/022 |
| 2018/0201266 A1* | 7/2018 | Dodo | B60W 10/06 |
| 2018/0229734 A1* | 8/2018 | Tsukamoto | F16H 63/502 |
| 2019/0195360 A1 | 6/2019 | Washio | |
| 2019/0299979 A1 | 10/2019 | Sadakiyo et al. | |
| 2020/0248783 A1* | 8/2020 | Ohgata | F16H 37/022 |
| 2021/0188280 A1* | 6/2021 | Abe | B60W 30/19 |

FOREIGN PATENT DOCUMENTS

| | | |
|---|---|---|
| JP | 2010-149696 A | 7/2010 |
| JP | 2017-036783 A | 2/2017 |
| JP | 2019-116962 A | 7/2019 |
| JP | 2019-172088 A | 10/2019 |

\* cited by examiner

FIG. 2

| CONTROL MODE | HYDRAULIC OIL TEMPERATURE | TRAVELING MODE | COMPUTATION OF ESTIMATED DRIVING FORCE |
|---|---|---|---|
| NORMAL CONTROL | ORDINARY TEMPERATURE | VARIABLE BETWEEN GEAR TRAVELING MODE AND BELT TRAVELING MODE | INERTIA AND EFFICIENCY TAKEN INTO CONSIDERATION |
| | EXTREMELY LOW TEMPERATURE | FIXED TO BELT TRAVELING MODE & $\gamma$ NOT FIXED | |
| AUTOMATIC PARKING CONTROL | ORDINARY TEMPERATURE | FIXED TO GEAR TRAVELING MODE | INERTIA AND EFFICIENCY NOT TAKEN INTO CONSIDERATION |
| | EXTREMELY LOW TEMPERATURE | FIXED TO BELT TRAVELING MODE & $\gamma$ FIXED TO $\gamma$max | |

FIG. 3

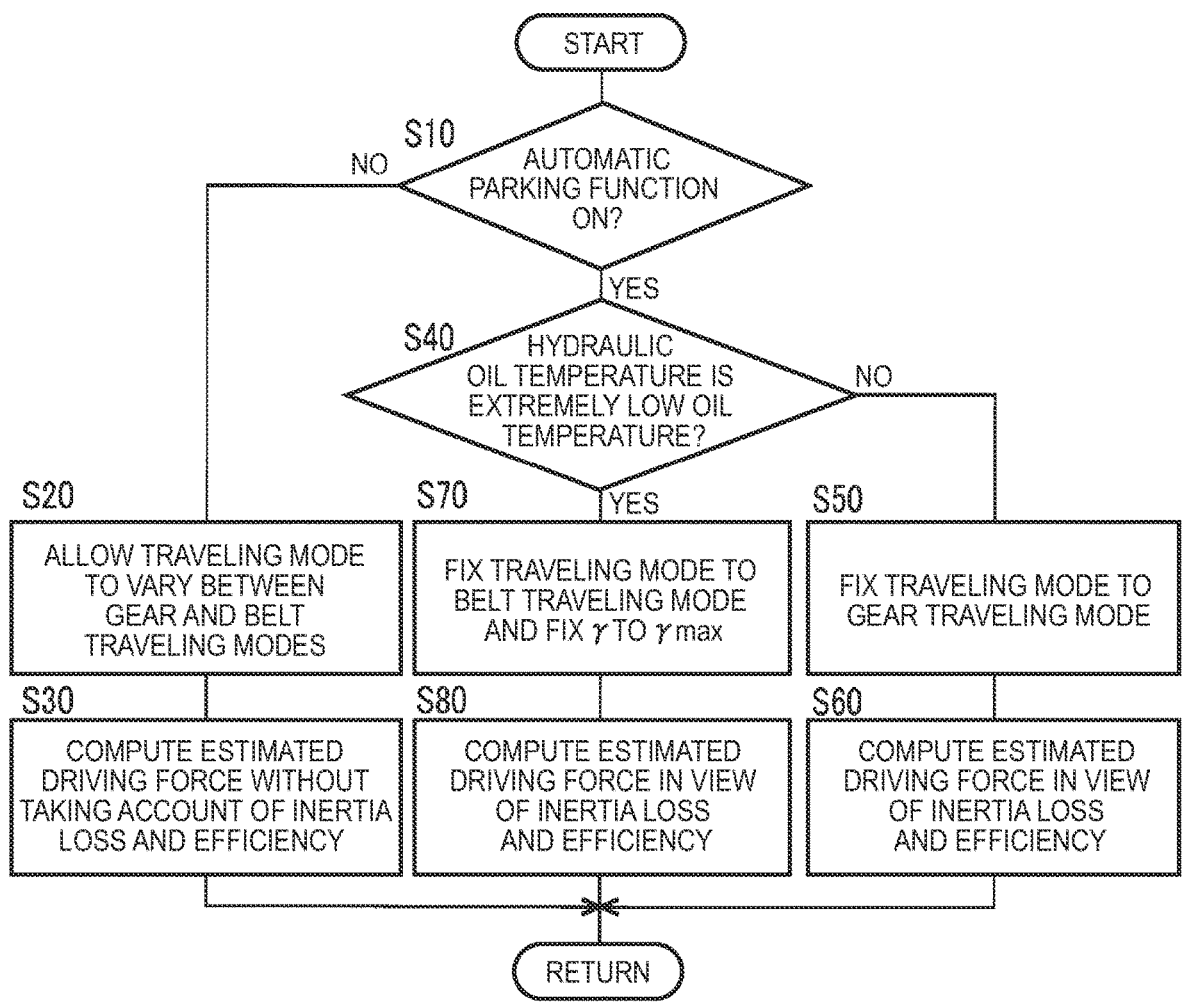

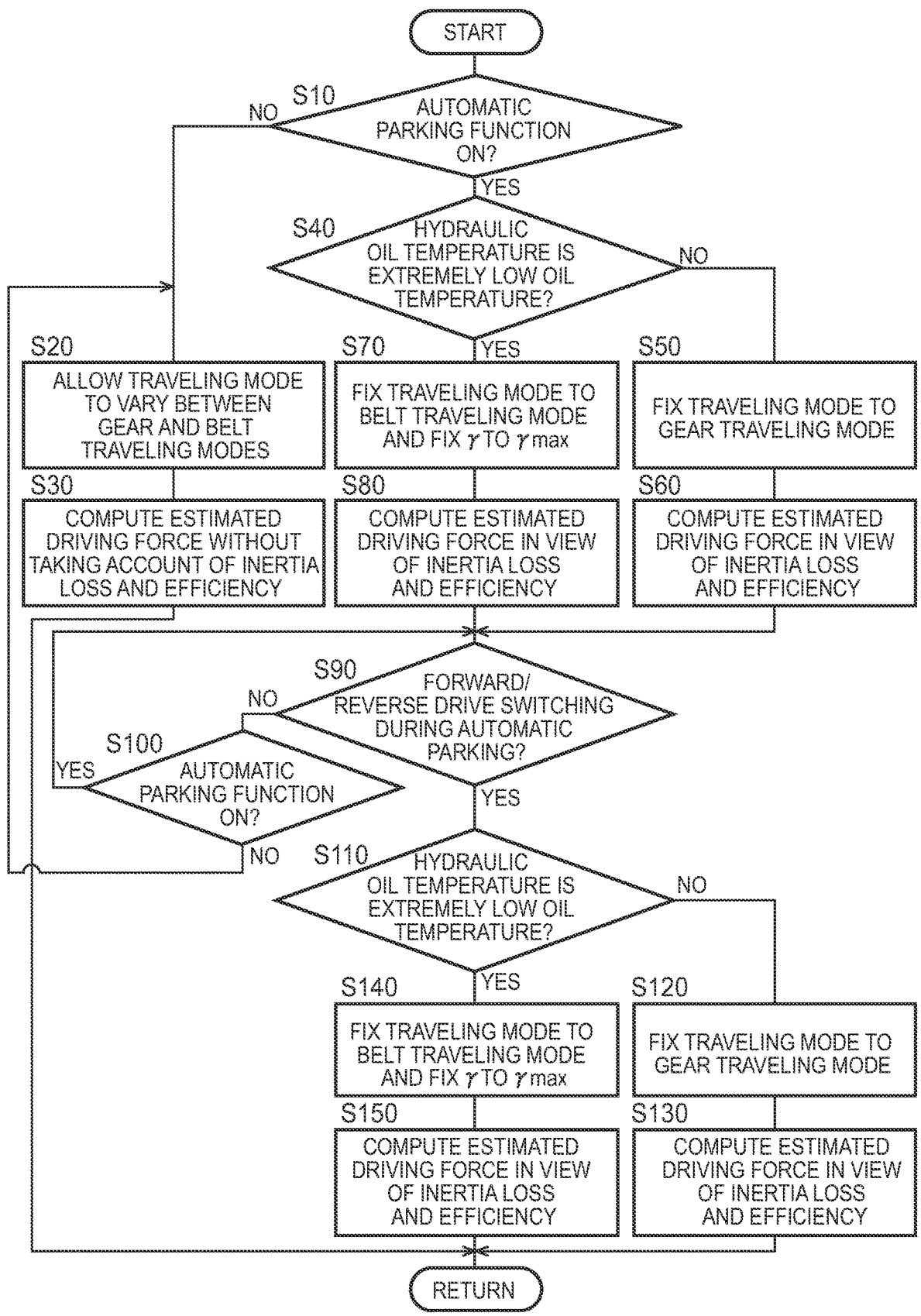

CONTROL APPARATUS OF POWER TRANSMISSION SYSTEM FOR VEHICLE

INCORPORATION BY REFERENCE

The disclosure of Japanese Patent Application No. 2019-224932 filed on Dec. 12, 2019 including the specification, drawings and abstract is incorporated herein by reference in its entirety.

BACKGROUND

1. Technical Field

The present disclosure relates to a control apparatus of a power transmission system for a vehicle having two or more power transmission paths provided in parallel with each other between a power source and drive wheels.

2. Description of Related Art

A control apparatus of a power transmission system for a vehicle, which has two or more power transmission paths provided in parallel with each other between an input rotary member to which power of a power source is transmitted, and an output rotary member that outputs the power to drive wheels, is well known in the art. Each of the power transmission paths permits the power to be transmitted from the input rotary member to the output rotary member. The power transmission paths include a first power transmission path that is formed through engagement of a hydraulic first friction engagement device, and includes a stepped change gear mechanism of which the speed ratio or ratios is/are fixed, and a second power transmission path that is formed through engagement of a hydraulic second friction engagement device, and includes a stepless speed change mechanism of which the speed ratio is variable. The speed ratio of the stepless speed change mechanism is on the higher-vehicle-speed side than that of the first power transmission path. One example of the control apparatus of the power transmission system for the vehicle is described in Japanese Unexamined Patent Application Publication No. 2019-116962 (JP 2019-116962 A). As described in JP 2019-116962 A, the traveling mode of the vehicle is switched between a first traveling mode in which the vehicle can travel with the power transmitted via the first power transmission path, and a second traveling mode in which the vehicle can travel with the power transmitted via the second power transmission path, based on traveling conditions of the vehicle. Also, when the vehicle speed is in a middle-speed or high-speed region, the vehicle travels in the second traveling mode while varying the speed ratio of the stepless speed change mechanism.

SUMMARY

In the meantime, it may be considered to set a target parking position, and execute automatic parking control for automatically parking the vehicle to the target parking position, using an estimated value of driving force. Under the automatic parking control, the vehicle speed is controlled with braking force, for example, so that the vehicle is stopped at the target parking position. Also, the automatic parking control involves control of the vehicle speed in a low vehicle-speed region, and driving force generated during automatic parking control is small. Thus, if the estimated value of the driving force is not accurately calculated when the automatic parking control is performed, a problem may arise in the controllability of the automatic parking control.

The present disclosure provides a control apparatus of a power transmission system for a vehicle, which is able to curb reduction of the controllability of automatic parking control, when the automatic parking control is performed.

One aspect of the present disclosure is concerned with a control apparatus of a power transmission system for a vehicle, which has a first power transmission path and a second power transmission path which are provided in parallel with each other between an input rotary member to which power of a power source is transmitted, and an output rotary member that delivers the power to drive wheels, and are respectively adapted to permit the power to be transmitted from the input rotary member to the output rotary member. The first power transmission path is formed through engagement of a hydraulic first friction engagement device, and includes a stepped change gear mechanism having at least one fixed speed ratio, and the second power transmission path is formed through engagement of a hydraulic second friction engagement device, and includes a stepless speed change mechanism of which a speed ratio is variable. The speed ratio of the stepless speed change mechanism is on the higher side than (i.e., smaller than) that of the first power transmission path. The control apparatus includes a computing unit configured to calculate an estimated value of driving force at the drive wheels, through predetermined driving force computation based on a speed ratio of the power transmission system, an automatic parking controller configured to set a target parking position, and execute automatic parking control for automatically parking the vehicle at the target parking position, using the estimated value of the driving force, and a shift controller configured to switch a traveling mode between a first traveling mode that permits the vehicle to travel with the power transmitted via the first power transmission path, and a second traveling mode that permits the vehicle to travel with the power transmitted via the second power transmission path, based on traveling conditions of the vehicle. During execution of the automatic parking control, the computing unit is configured to calculate the estimated value of the driving force, while taking account of an inertia loss that appears in the power transmission system and a transmission efficiency of the power transmission system. During execution of the automatic parking control, the shift controller is configured to set the traveling mode to the first traveling mode, or set the traveling mode to the second traveling mode and fix the speed ratio of the stepless speed change mechanism to a predetermined low-vehicle-speed side speed ratio.

With the control apparatus thus configured, during execution of the automatic parking control, the estimated value of the driving force is calculated, in view of the inertia loss that appears in the power transmission system and the transmission efficiency of the power transmission system, so that the estimation accuracy of the driving force is improved. In addition, during execution of the automatic parking control, the traveling mode is set to the first traveling mode, or the traveling mode is set to the second traveling mode and the speed ratio of the stepless speed change mechanism is fixed to the predetermined low-vehicle-speed side speed ratio. Thus, when the inertia loss and the transmission efficiency are taken into consideration in computation of the estimated value of the driving force used of the automatic parking control, an unstable element caused by continuous change of the speed ratio is removed or reduced. Thus, when the automatic parking control is executed, the controllability of the automatic parking control is less likely or unlikely to be reduced.

In the control apparatus according to the above aspect, the shift controller may be configured to switch the traveling mode between the first traveling mode and the second traveling mode, through clutch to clutch shifting to release one of the first friction engagement device and the second friction engagement device and engage the other. The shift controller may be configured to restrict the clutch to clutch shifting, when a temperature of a hydraulic oil for switching an operating state of each of the first friction engagement device and the second friction engagement device is lower than a predetermined oil temperature. During execution of the automatic parking control, the shift controller may be configured to set the traveling mode to the second traveling mode and fix the speed ratio of the stepless speed change mechanism to the predetermined low-vehicle-speed side speed ratio, when the temperature of the hydraulic oil is lower than the predetermined oil temperature, and may be configured to set the traveling mode to the first traveling mode, when the temperature of the hydraulic oil is equal to or higher than the predetermined oil temperature.

With the control apparatus thus configured, when the temperature of the hydraulic oil is lower than the predetermined oil temperature, during execution of the automatic parking control, the traveling mode is set to the second traveling mode, and the speed ratio of the stepless speed change mechanism is fixed to the predetermined low-vehicle-speed side speed ratio. Thus, the driving force is secured under the automatic parking control, and the vehicle can travel while varying the speed ratio of the stepless speed change mechanism in the second traveling mode, without going through clutch to clutch shifting, after cancellation of the automatic parking control. Also, when the temperature of the hydraulic oil is equal to or higher than the predetermined oil temperature, during execution of the automatic parking control, the traveling mode is set to the first traveling mode, so that the driving force is more likely to be secured under the automatic parking control. Thus, when the automatic parking control is performed, the drivability is less likely or unlikely to be deteriorated.

In the control apparatus as described above, during execution of the automatic parking control, the shift controller may be configured not to perform switching between the first traveling mode and the second traveling mode according to the temperature of the hydraulic oil while the vehicle is traveling, and may be configured to perform switching between the first traveling mode and the second traveling mode according to the temperature of the hydraulic oil, when the vehicle is temporarily stopped.

With the control apparatus thus configured, during execution of the automatic parking control, switching between the first traveling mode and the second traveling mode according to the temperature of the hydraulic oil is not performed while the vehicle is traveling, whereas switching between the first traveling mode and the second traveling mode according to the temperature of the hydraulic oil is performed, when the vehicle is temporarily stopped. Thus, the automatic parking control is less likely or unlikely to be influenced by variation in the driving force due to switching of the traveling mode, and the automatic parking control is performed in the traveling mode appropriately established.

In the control apparatus according to the above aspect, the computing unit may be configured to calculate the estimated value of the driving force, without taking account of the inertia loss and the transmission efficiency, while the automatic parking control is not being executed.

With the control apparatus thus configured, while the automatic parking control is not being executed, the estimated value of the driving force is calculated, without taking account of the inertia loss and the transmission efficiency. As a result, the estimation accuracy of the driving force may not be improved, but the estimated value of the driving force is stably calculated even when the speed ratio is continuously varied.

In the control apparatus according to the above aspect, the computing unit may be configured to calculate required power source torque required of the power source, through predetermined torque computation based on the speed ratio of the power transmission system. The computing unit may be configured to calculate the required power source torque, while taking account of the inertia loss and the transmission efficiency, during execution of the automatic parking control, and may be configured to calculate the required power source torque, without taking account of the inertia loss and the transmission efficiency, while the automatic parking control is not being executed.

With the control apparatus thus configured, during execution of the automatic parking control, the required power source torque is calculated, in view of the inertia loss and the transmission efficiency, so that the calculation accuracy of the required power source torque is improved. While the automatic parking control is not being executed, the required power source torque is calculated, without taking account of the inertia loss and the transmission efficiency, so that the required power source torque is stably calculated even when the speed ratio is continuously varied.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 2 is a table indicating a traveling mode and a method of calculating estimated driving force, for each control mode, which are determined so as to curb reduction of the drivability and reduction of the controllability of automatic parking control;

FIG. 3 is a flowchart illustrating a principal part of control operation of an electronic control unit, and illustrating control operation for curbing reduction of the controllability of the automatic parking control when it is performed; and FIG. 4 is a flowchart illustrating a principal part of control operation of the electronic control unit, and illustrating control operation for curbing reduction of the controllability of the automatic parking control when it is performed, according to an embodiment different from that of FIG. 3.

DETAILED DESCRIPTION OF EMBODIMENTS

Figure 1:
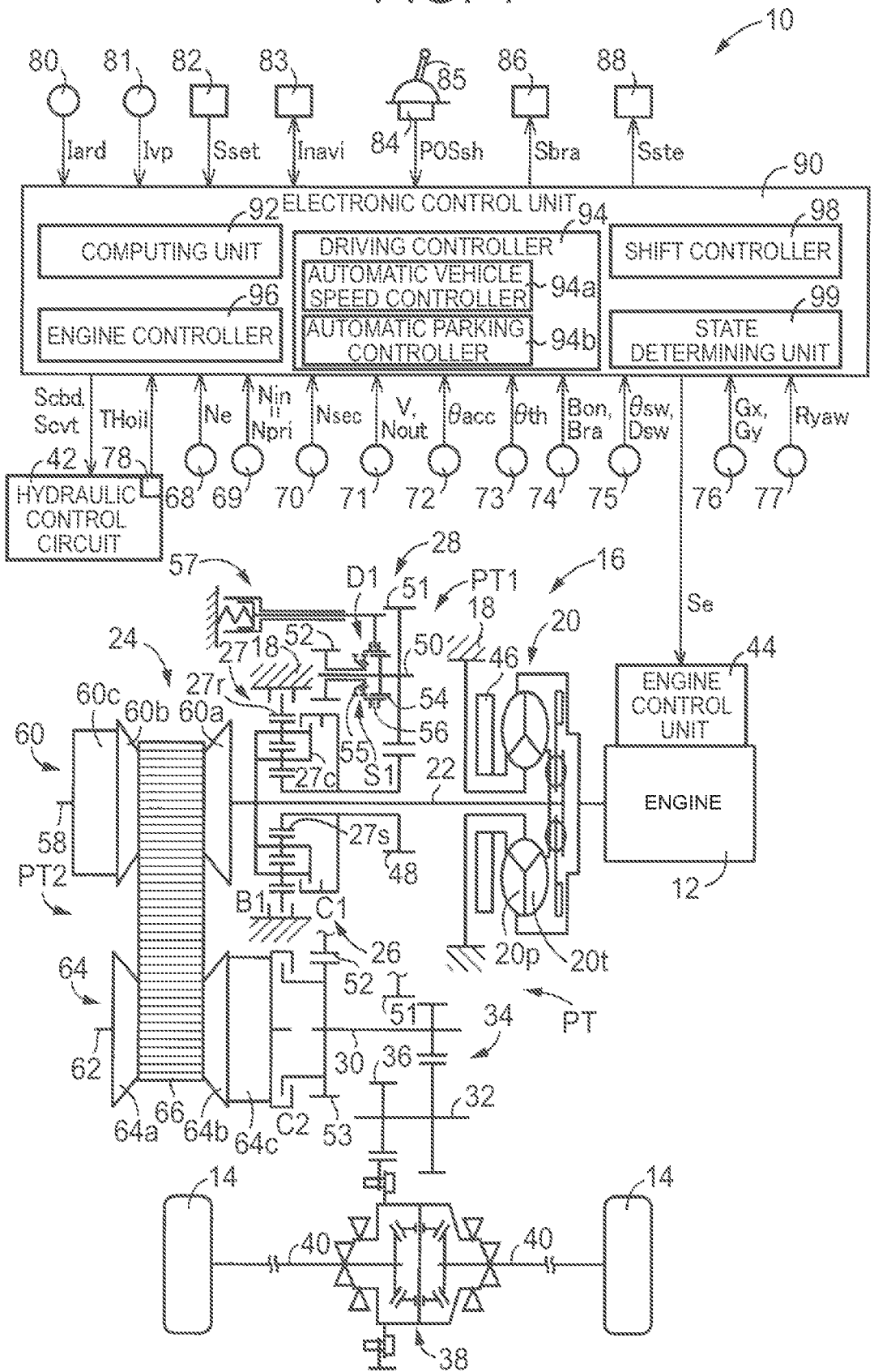
FIG. 1 is a view illustrating the general configuration of a vehicle to which the present disclosure is applied, and also illustrating control functions and a principal part of a control system for various controls in the vehicle.

In one embodiment of the present disclosure, the stepless speed change mechanism is a continuously variable transmission having a transmission element looped around a primary pulley and a secondary pulley. Each of the primary pully as an input-side pulley and the secondary pulley as an output-side pulley has a fixed sheave, a movable sheave, and a hydraulic actuator that provides thrust for changing the width of a groove between the fixed sheave and the movable sheave, for example. A vehicle including the power transmission system as described above includes a hydraulic control circuit that controls pulley hydraulic pressures as hydraulic oil pressures supplied to the hydraulic actuators of the respective pulleys, independently of each other. The hydraulic control circuit may be configured to control the flow rate of hydraulic oil supplied to each hydraulic actuator, for example, thereby to eventually generate the pulley hydraulic pressure. With the hydraulic control circuit thus configured, the thrust (=pulley hydraulic pressure×pressure-receiving area) applied to each of the primary pulley and the secondary pulley is controlled, so that shift control is performed so as to achieve target change of the speed ratio while preventing slipping of the transmission element. The transmission element looped around the primary pulley and the secondary pulley may be an endless, annular push-type transmission belt, which has an endless, annular hoop, and a multiplicity of elements in the form of blocks like thick plate pieces stacked in the thickness direction along the hoop, or a pull-type transmission belt, which has link plates stacked alternately, and connecting pins that connect end portions of the link plates so as to form an endless, annular link chain, for example. The stepless speed change mechanism is a known belt-type continuously variable transmission. In a broad sense, the concept of the belt-type continuously variable transmission includes a chain-type continuously variable transmission.

The speed ratio (=gear ratio) of the power transmission system, or the stepless speed change mechanism, or the like, is "the rotational speed of a rotary member on the input side/the rotational speed of a rotary member on the output side". For example, the speed ratio of the stepless speed change mechanism is "the rotational speed of the primary pulley/the rotational speed of the secondary pulley". Also, the speed ratio of the power transmission system is "the rotational speed of the input rotary member/the rotational speed of the output rotary member". The high side of the speed ratio is the high-vehicle-speed side on which the speed ratio is reduced. The low side of the speed ratio is the low-vehicle-speed side on which the speed ratio is increased. For example, the lowest-side speed ratio is the speed ratio on the lowest vehicle speed side, and is equivalent to the maximum speed ratio where the speed ratio assumes the largest value.

The power source is an engine, such as a gasoline engine or a diesel engine, which generates power by burning fuel, for example. Also, the vehicle may include an electric motor, or the like, as a power source, in addition to or in place of the engine.

Some embodiments of the present disclosure will be described in detail with reference to the drawings.

FIG. 1 illustrates the general configuration of a vehicle 10 to which the present disclosure is applied, and also illustrates control functions and a principal part of a control system for various controls performed in the vehicle 10. In FIG. 1, the vehicle 10 includes an engine 12 that functions as a power source, drive wheels 14, and a vehicular power transmission system 16 provided on power transmission paths between the engine 12 and the drive wheels 14. The vehicular power transmission system 16 will be referred to as "power transmission system 16".

The power transmission system 16 includes a known torque converter 20 as a fluid transmission device coupled to the engine 12, input shaft 22 coupled to the torque converter 20, continuously variable transmission (which will be called "CVT") 24 coupled to the input shaft 22, forward/reverse drive switching device 26 also coupled to the input shaft 22, and gear mechanism 28 connected to the input shaft 22 via the forward/reverse drive switching device 26 and arranged in parallel with the CVT 24. The power transmission system 16 further includes an output shaft 30 as a common output rotary member of the CVT 24 and the gear mechanism 28, countershaft 32, reduction gear device 34, gear 36, differential gear unit 38, and so forth. The reduction gear device 34 consists of a pair of gears meshing with each other and provided on the output shaft 30 and the countershaft 32, respectively, such that the gears cannot rotate relative to the respective shafts 30, 32. The gear 36 is relatively non-rotatably provided on the countershaft 32, and the differential gear unit 38 is coupled to the gear 36. The above-indicated components of the power transmission system 16 are housed in a case 18 as a non-rotary member. The power transmission system 16 also includes right and left axles 40 coupled to the differential gear unit 38. The input shaft 22 is an input rotary member to which power of the engine 12 is transmitted. The output shaft 30 is an output rotary member that delivers power of the engine 12 to the drive wheels 14. The power is equivalent to torque or force when they are not particularly distinguished from each other.

In the power transmission system 16 thus constructed, power generated from the engine 12 is transmitted to the right and left drive wheels 14, via the torque converter 20, forward/reverse drive switching device 26, gear mechanism 28, reduction gear device 34, differential gear unit 38, axles 40, and so forth, in the order of description. Alternatively, in the power transmission system 16, power generated from the engine 12 is transmitted to the right and left drive wheels 14, via the torque converter 20, CVT 24, reduction gear device 34, differential gear unit 38, axles 40, and so forth, in the order of description.

As described above, in the power transmission system 16, the gear mechanism 28 and the CVT 24 are provided in parallel with each other, on power transmission paths PT between the engine 12 and the drive wheels 14. More specifically, in the power transmission system 16, the gear mechanism 28 and the CVT 24 are provided in parallel with each other on the power transmission paths PT between the input shaft 22 and the output shaft 30. Namely, the power transmission system 16 has two or more power transmission paths provided in parallel with each other between the input shaft 22 and the output shaft 30, and power of the engine 12 can be transmitted from the input shaft 22 to the output shaft 30, via each of the power transmission paths. The power transmission paths are a first power transmission path PT1 through which power is transmitted via the gear mechanism 28, and a second power transmission path PT2 through which power is transmitted via the CVT 24. Namely, in the power transmission system 16, the first power transmission path PT1 and the second power transmission path PT2 are provided in parallel with each other between the input shaft 22 and the output shaft 30. The first power transmission path PT1 permits power of the engine 12 to be transmitted from the input shaft 22 to the drive wheels 14 via the gear mechanism 28. The second power transmission path PT2 permits power of the engine 12 to be transmitted from the input shaft 22 to the drive wheels 14 via the CVT 24.

In the power transmission system 16, the power transmission path through which power of the engine 12 is transmitted to the drive wheels 14 is switched between the first power transmission path PT1 and the second power transmission path PT2, according to traveling conditions of the vehicle 10. To this end, the power transmission system 16 includes two or more engagement devices that selectively form the first power transmission path PT1 and the second power transmission path PT2. The engagement devices include a first clutch C1, first brake B1, and second clutch C2. The first clutch C1 is an engagement device that is provided on the first power transmission path PT1, for selectively connecting or disconnecting the first power transmission path PT1. The first clutch C1 is engaged when the vehicle travels forward, so that the first power transmission path PT1 is formed. The first brake B1 is an engagement device that is provided on the first power transmission path PT1, for selectively connecting or disconnecting the first power transmission path PT1. The first brake B1 is engaged when the vehicle travels backward, so that the first power transmission path PT1 is formed. The first power transmission path PT1 is formed through engagement of the first clutch C1 or the first brake B1. The second clutch C2 is an engagement device that is provided on the second power transmission path PT2, for selectively connecting or disconnecting the second power transmission path PT2. When the second clutch C2 is engaged, the second power transmission path PT2 is formed. The second power transmission path PT2 is formed through engagement of the second clutch C2. Each of the first clutch C1, first brake B1, and second clutch C2 is a known hydraulic wet friction engagement device that is frictionally engaged by a corresponding hydraulic actuator. The first clutch C1 is a first friction engagement device for forward travel, and the second clutch C2 is a second friction engagement device, while the first brake B1 is a first friction engagement device for reverse travel. The first clutch C1 and the first brake B1 constitute the forward/reverse drive switching device 26, as will be described later. The operating state of each of the above engagement devices is switched between an engaged state and a released state, when a control pressure as a hydraulic pressure regulated by a hydraulic control circuit 42 included in the vehicle 10 is supplied to the corresponding hydraulic actuator.

The engine 12 includes an engine control unit 44 having various devices, such as an electronic throttle device, fuel injection device, and ignition device, which are needed for output control of the engine 12. The engine control unit 44 of the engine 12 is controlled by an electronic control unit 90 that will be described later, according to an accelerator operation amount θacc corresponding to a drive amount requested by the driver to be generated by the vehicle 10, for example, so that engine torque Te as output torque of the engine 12 is controlled.

The torque converter 20 includes a pump impeller 20p coupled to the engine 12, and a turbine wheel 20t coupled to the input shaft 22. The torque converter 20 is a fluid transmission device that transmits power of the engine 12 to the input shaft 22. The power transmission system 16 includes a mechanical oil pump 46 coupled to the pump impeller 20p. The oil pump 46 is rotated and driven by the engine 12, so as to supply hydraulic oil OIL to the hydraulic control circuit 42. The hydraulic oil OIL provides an original pressure of hydraulic pressures for controlling the speed ratio of the CVT 24, generating belt clamping force in the CVT 24, and switching operating states of the respective engagement devices, for example.

The forward/reverse drive switching device 26 includes a double pinion type planetary gear train 27, first clutch C1, and first brake B1. The planetary gear train 27 is a differential mechanism having three rotating elements, i.e., a carrier 27c as an input element, a sun gear 27s as an output element, and a ring gear 27r as a reaction force element. The carrier 27c is coupled to the input shaft 22. The ring gear 27r is selectively coupled to the case 18 via the first brake B1. The sun gear 27s is coupled to a small-diameter gear 48 that is disposed radially outward of and coaxially with the input shaft 22, such that it can rotate relative to the input shaft 22. The carrier 27c and the sun gear 27s are selectively coupled to each other via the first clutch C1.

The gear mechanism 28 includes the small-diameter gear 48, a gear-mechanism countershaft 50, and a large-diameter gear 51 that meshes with the small-diameter gear 48. The large-diameter gear 51 is disposed radially outward of and coaxially with the gear-mechanism countershaft 50, such that it cannot rotate relative to the countershaft 50. The large-diameter gear 51 has a larger diameter than the small-diameter gear 48. The gear mechanism 28 also includes an idler gear 52 that is disposed radially outward of and coaxially with the gear-mechanism countershaft 50, such that it can rotate relative to the countershaft 50, and an output gear 53 that meshes with the idler gear 52, and is disposed radially outward of and coaxially with the output shaft 30 such that it cannot rotate relative to the output shaft 30. The output gear 53 has a larger diameter than the idler gear 52. With this arrangement, the gear mechanism 28 forms one gear position, on the power transmission path PT between the input shaft 22 and the output shaft 30. The gear mechanism 28 has a gear position, namely, it is a stepped change gear mechanism having a fixed speed ratio (equivalent to gear ratio). The gear mechanism 28 further includes a dog clutch D1 that is provided between the large-diameter gear 51 and the idler gear 52, around the gear-mechanism countershaft 50, for selectively connecting or disconnecting a power transmission path between the gears 51, 52. The dog clutch D1 is an engagement device that selectively connects or disconnects the first power transmission path PT1, and forms the first power transmission path PT1 when it is engaged. The dog clutch D1 is one of the above-indicated two or more engagement devices, which forms the first power transmission path PT1 when it is engaged along with the first clutch C1 or the first brake B1.

The dog clutch D1 includes a clutch hub 54, a clutch gear 55, and a cylindrical sleeve 56. The clutch hub 54 is disposed radially outward of and coaxially with the gear-mechanism countershaft 50, such that it cannot rotate relative to the countershaft 50. The clutch gear 55 is disposed between the idler gear 52 and the clutch hub 54, and is fixed to the idler gear 52. The sleeve 56 is splined to the clutch hub 54, such that the sleeve 56 cannot rotate relative to the gear-mechanism countershaft 50 about its axis, but can move relative to the countershaft 50 in a direction parallel to the axis. In the dog clutch D1 thus constructed, the sleeve 56 that is rotated as a unit with the clutch hub 54 all the time is moved toward the clutch gear 55, and is engaged with the clutch gear 55, so that the idler gear 52 and the gear-mechanism countershaft 50 are connected to each other. Further, the dog clutch D1 includes a known synchromesh mechanism S1 as a synchronization mechanism, which synchronizes rotation when engaging the sleeve 56 with the clutch gear 55. The dog clutch D1 is switched between the engaged state and the released state, when the sleeve 56 is caused to slide in a direction parallel to the axis of the gear-mechanism countershaft 50, through operation of a hydraulic actuator 57 as an actuator provided in the power transmission system 16. Thus, the dog clutch D1, which is equipped with the synchromesh mechanism S1, selectively connects or disconnects the power transmission path between the engine 12 and the drive wheels 14, when it is operated by the hydraulic actuator 57.

The first power transmission path PT1 is formed when the dog clutch D1, and the first clutch C1 provided closer to the input shaft 22 than the dog clutch D1, are both engaged. The first power transmission path PT1 is also formed, through engagement of the first brake B1 provided closer to the input shaft 22 than the dog clutch D1 and selectively engaged in place of the first clutch C1, and the dog clutch D1. The power transmission path for forward travel is formed through engagement of the first clutch C1, whereas the power transmission path for reverse travel is formed through engagement of the first brake B1. The first power transmission path PT1 formed through engagement of the first clutch C1 and the dog clutch D1 is a first power transmission path for forward travel. The first power transmission path PT1 formed through engagement of the first brake B1 and the dog clutch D1 is a first power transmission path for reverse travel. When the first power transmission path PT1 is formed in the power transmission system 16, it is placed in a power transmittable state in which power of the engine 12 can be transmitted from the input shaft 22 to the output shaft 30 via the gear mechanism 28. On the other hand, when the first clutch C1 and the first brake B1 are both released, or the dog clutch D1 is released, the first power transmission path PT1 is placed in a neutral state in which power cannot be transmitted.

The CVT 24 includes a primary shaft 58 provided on the same axis as the input shaft 22 and coupled integrally to the input shaft 22, a primary pulley 60 coupled to the primary shaft 58 and having a variable effective diameter, a secondary shaft 62 provided on the same axis as the output shaft 30, a secondary pulley 64 coupled to the secondary shaft 62 and having a variable effective diameter, and a transmission belt 66 that is looped around the pulleys 60, 64, and serves as a transmission element. The CVT 24 is a known belt-type continuously variable transmission in which power is transmitted between each pulley 60, 64 and the transmission belt 66 via frictional force, and transmits power of the engine 12 toward the drive wheels 14. The frictional force has the same meaning as clamping force, and may also be called "belt clamping force". The belt clamping force is a belt torque capacity as the torque capacity of the transmission belt 66 in the CVT 24.

The primary pulley 60 includes a fixed sheave 60a coupled to the primary shaft 58, a movable sheave 60b provided such that it cannot rotate relative to the fixed sheave 60a about the axis of the primary shaft 58 but can move in the axial direction, and a hydraulic actuator 60c that applies primary thrust Wpri to the movable sheave 60b. The primary thrust Wpri is thrust force (=primary pressure Ppri×pressure-receiving area) of the primary pulley 60 for changing the width of a V-groove between the fixed sheave 60a and the movable sheave 60b. Namely, the primary thrust Wpri is thrust force of the primary pulley 60 applied by the hydraulic actuator 60c for clamping the transmission belt 66. The primary pressure Ppri is a hydraulic pressure supplied from the hydraulic control circuit 42 to the hydraulic actuator 60c, and is a pulley hydraulic pressure that gives rise to the primary thrust Wpri. The secondary pulley 64 includes a fixed sheave 64a coupled to the secondary shaft 62, a movable sheave 64b provided such that it cannot rotate relative to the fixed sheave 64a about the axis of the secondary shaft 62 but can move in the axial direction, and a hydraulic actuator 64c that applies secondary thrust Wsec to the movable sheave 64b. The secondary thrust Wsec is thrust force (=secondary pressure Psec×pressure-receiving area) of the secondary pulley 64 for changing the width of a V-groove between the fixed sheave 64a and the movable sheave 64b. Namely, the secondary thrust Wsec is thrust force of the secondary pulley 64 applied by the hydraulic actuator 64c for clamping the transmission belt 66. The secondary pressure Psec is a hydraulic pressure supplied from the hydraulic control circuit 42 to the hydraulic actuator 64c, and is a pulley hydraulic pressure that gives rise to the secondary thrust Wsec.

In the CVT 24, the primary pressure Ppri and secondary pressure Psec are respectively regulated or controlled by the hydraulic control circuit 42 driven by the electronic control unit 90 that will be described later, so that the primary thrust Wpri and secondary thrust Wsec are respectively controlled. As a result, in the CVT 24, the V-groove width of each pulley 60, 64 changes, so that the engagement diameter (=effective diameter) of the transmission belt 66 is changed, and the speed ratio γcvt (=primary rotational speed Npri/ secondary rotational speed Nsec) is changed. Also, the belt clamping force is controlled so as to prevent the transmission belt 66 from slipping. Namely, the primary thrust Wpri and the secondary thrust Wsec are respectively controlled, so as to make the speed ratio γcvt of the CVT 24 equal to a target speed ratio γcvttgt, while preventing belt slipping as slipping of the transmission belt 66. The primary rotational speed Npri is the rotational speed of the primary shaft 58, and the secondary rotational speed Nsec is the rotational speed of the secondary shaft 62.

In the CVT 24, as the primary pressure Ppri is raised, the V-groove width of the primary pulley 60 is reduced, and the speed ratio γcvt is reduced. With the speed ratio γcvt thus reduced, the CVT 24 is upshifted. In the CVT 24, when the V-groove width of the primary pulley 60 is minimized, the highest-side speed ratio γmin is formed. The highest-side speed ratio γmin is the speed ratio γcvt on the highest vehicle speed side, within a range of the speed ratio γcvt which can be formed by the CVT 24, and is the minimum speed ratio at which the speed ratio γcvt assumes the smallest value. On the other hand, in the CVT 24, as the primary pressure Ppri is lowered, the V-groove width of the primary pulley 60 is increased, and the speed ratio γcvt is increased. With the speed ratio γcvt thus increased, the CVT 24 is downshifted. In the CVT 24, when the V-groove width of the primary pulley 60 is maximized, the lowest-side speed ratio γmax is formed. The lowest-side speed ratio γmax is the speed ratio γcvt on the lowest vehicle speed side, within the range of the speed ratio γcvt which can be formed by the CVT 24, and is the maximum speed ratio at which the speed ratio γcvt assumes the largest value. In the CVT 24, belt slipping is prevented due to the primary thrust Wpri and the secondary thrust Wsec, and the target speed ratio γcvttgt is achieved by use of the relationship between the primary thrust Wpri and the secondary thrust Wsec, but not achieved by only one of the thrusts Wpri, Wsec. The speed ratio γcvt of the CVT 24 is changed by changing the thrust ratio τ (=Wsec/Wpri) as a value indicating the ratio of the secondary thrust Wsec to the primary thrust Wpri, and representing a relationship between the primary pressure Ppri and the secondary pressure Psec. For example, as the thrust ratio τ is larger, the speed ratio γcvt is increased. Namely, the CVT 24 is downshifted.

The output shaft 30 is disposed on the same axis as the secondary shaft 62, such that the output shaft 30 can rotate relative to the secondary shaft 62. The second clutch C2 is provided on a power transmission path between the secondary pulley 64 and the output shaft 30. The second power transmission path PT2 is formed when the second clutch C2 is engaged. When the second power transmission path PT2 is formed in the power transmission system 16, it is placed in a power transmittable state in which power of the engine 12 can be transmitted from the input shaft 22 to the output shaft 30 via the CVT 24. On the other hand, when the second clutch C2 is released, the second power transmission path PT2 is placed in a neutral state. The speed ratio γcvt of the CT 24 corresponds to the speed ratio on the second power transmission path PT2.

In the power transmission system 16, the speed ratio EL of the gear mechanism 28 as the speed ratio γgear (=input shaft speed Nin/output shaft speed Nout) on the first power transmission path PT1 is set to a larger value than the lowest-side speed ratio γmax of the CVT 24 as the maximum speed ratio on the second power transmission path PT2. Namely, the speed ratio EL is set to a speed ratio on the lower side than the lowest-side speed ratio γmax. The speed ratio EL of the gear mechanism 28 corresponds to the first-speed speed ratio γ1 in the power transmission system 16, and the lowest-side speed ratio γmax of the CVT 24 corresponds to the second-speed speed ratio γ2 in the power transmission system 16. Thus, the speed ratio formed on the second power transmission path PT2 is on the higher side than that formed on the first power transmission path PT1. The input shaft speed Nin is the rotational speed of the input shaft 22, and the output shaft speed Nout is the rotational speed of the output shaft 30.

The vehicle 10 is able to travel in a selected one of a gear traveling mode and a belt traveling mode. In the gear traveling mode, the vehicle 10 can travel, using the first power transmission path PT1, and the first power transmission path PT1 is formed in the power transmission system 16. Namely, the gear traveling mode is the first traveling mode in which the vehicle 10 can travel with power of the engine 12 transmitted via the first power transmission path PT1. In the belt traveling mode, the vehicle 10 can travel, using the second power transmission path PT2, and the second power transmission path PT2 is formed in the power transmission system 16. Namely, the belt traveling mode is the second traveling mode in which the vehicle 10 can travel with power of the engine 12 transmitted via the second power transmission path PT2. When the vehicle travels forward in the gear traveling mode, the first clutch C1 and the dog clutch D1 are engaged, and the second clutch C2 and the first brake B1 are released. When the vehicle travels backward in the gear traveling mode, the first brake B1 and the dog clutch D1 are engaged, and the second clutch C2 and the first clutch C1 are released. In the belt traveling mode, the second clutch C2 is engaged, and the first clutch C1 and the first brake B1 are released. In the belt traveling mode, the vehicle can travel forward.

The gear traveling mode is selected in a relatively low-vehicle-speed region including a period in which the vehicle is stopped. The belt traveling mode is selected in a relatively high-vehicle-speed region including a middle-vehicle-speed region. The dog clutch D1 is engaged in the belt traveling mode in the middle-vehicle-speed region, whereas the dog clutch D1 is released in the belt traveling mode in the high-vehicle-speed region. The dog clutch D1 is released in the belt traveling mode in the high-vehicle-speed region, so as to reduce or eliminate dragging of the gear mechanism 28, etc. during traveling in the belt traveling mode, and also prevent pinions, etc. as constituent members of the gear mechanism 28 and planetary gear unit 27 from rotating at high speeds in the high-vehicle-speed region. With the gear mechanism 28 thus prevented from rotating at a high speed, a difference between the input rotational speed and output rotational speed of the first clutch C1 is prevented from being increased, for example, and the durability of a friction material of the first clutch C1 is improved.

The vehicle 10 includes the electronic control unit 90 that serves as a controller including a control device of the power transmission system 16. The electronic control unit 90 includes a so-called microcomputer having a central processing unit (CPU), random access memory (RAM), read-only memory (ROM), input-output interface, etc., and the CPU performs signal processing according to programs stored in advance in the ROM, while utilizing the temporary storage function of the RAM, so as to perform various controls on the vehicle 10. The electronic control unit 90 performs output control of the engine 12, shift control and belt clamping force control of the CVT 24, hydraulic control for switching the operating state of each of the engagement devices (C1, B1, C2, D1), and so forth. The electronic control unit 90 is divided as needed into a sub-unit for engine control, sub-unit for hydraulic control, and so forth.

The electronic control unit 90 is supplied with various signals, etc. based on detection values or obtained information of various sensors, etc. included in the vehicle 10. The sensors include various rotational speed sensors 68, 69, 70, 71, accelerator position sensor 72, throttle opening sensor 73, brake pedal sensor 74, steering sensor 75, G sensor 76, yaw rate sensor 77, oil temperature sensor 78, vehicle vicinity information sensor 80, vehicle position sensor 81, drive assist setting switches 82, navigation system 83, and shift position sensor 84, for example. The above-indicated various signals include the engine speed Ne as the rotational speed of the engine 12, primary rotational speed Npri having the same value as the input shaft speed Nin, secondary rotational speed Nsec, output shaft speed Nout corresponding to the vehicle speed V, accelerator operation amount θacc as the amount of accelerating operation of the driver representing the magnitude of the accelerating operation of the driver, throttle opening θth as the opening degree of the electronic throttle valve, brake-ON signal Bon as a signal indicating a state in which the brake pedal for activating the wheel brakes is being operated by the driver, and brake operation amount Bra corresponding to the pedal force applied to the brake pedal and representing the magnitude of the depressing operation performed by the driver on the brake pedal. The signals further include the steering angle θsw and steering direction Dsw of the steering wheel included in the vehicle 10, longitudinal acceleration Gx of the vehicle 10, lateral acceleration Gy of the vehicle 10, yaw rate Ryaw as the rotational angular velocity about the vertical axis of the vehicle 10, hydraulic oil temperature THoil as a temperature of the hydraulic oil OIL, vehicle vicinity information Iard, position information Ivp, drive assist setting signal Sset as a signal indicating setting by the driver under drive assist control, such as cruise control or automatic parking control AP, navigation information Inavi, and operating position POSsh of a shift lever 85 included in the vehicle 10.

The input shaft speed Nin (=primary rotational speed Npri) is also the turbine speed Nt, and the primary rotational speed Npri is the rotational speed of the primary pulley 60, while the secondary rotational speed Nsec is the rotational speed of the secondary pulley 64. Also, the electronic control unit 90 calculates the actual speed ratio γcvt (=Npri/Nsec) as the actual speed ratio γcvt of the CVT 24, based on the primary rotational speed Npri and the secondary rotational speed Nsec.

The electronic control unit 90 generates various command signals to respective devices (e.g., the engine control unit 44, hydraulic control circuit 42, wheel brake device 86, and steering device 88) included in the vehicle 10. The command signals include, for example, an engine control command signal Se for controlling the engine 12, hydraulic control command signal Scvt for controlling the speed ratio, belt clamping force, etc. of the CVT 24, hydraulic control command signal Scbd for controlling the operating state of each of the engagement devices, brake control command signal Sbra for controlling the braking force Fb produced by the wheel brakes, steering control command signal Sste for controlling steering of vehicle wheels (in particular, front wheels), and so forth.

The vehicle vicinity information sensor 80 includes at least one of LIDAR (Light Detection and Ranging, Laser Imaging Detection and Ranging), radar, and vehicle-mounted camera, and directly obtains information concerning the road on which the vehicle is traveling, and information concerning an object or objects present around the vehicle. The LIDAR may consist of two or more LIDARs that detect any object in front of the vehicle 10, object on one side of the vehicle 10, and object behind the vehicle 10, respectively, or may be one LIDAR that detects an object or objects all around the vehicle 10. The LIDAR outputs object information concerning the detected object(s) as vehicle vicinity information Iard. The radar may consist of two or more radars that detect any object in front of the vehicle, object near the front of the vehicle, and object near the rear, respectively, and output object information concerning the detected object(s) as vehicle vicinity information Iard. The object information obtained by the LIDAR and radar includes the distance and direction of each object detected, from the vehicle 10. The vehicle-mounted camera may be a monocular camera or stereo camera that images the front or rear of the vehicle 10, for example, and outputs information of captured images, as vehicle vicinity information Iard. The captured image information includes, for example, lanes of the road on which the vehicle is traveling, traffic signs on the road, parking space, and other vehicles, pedestrians, and obstacles on the road, parking space, etc.

The vehicle position sensor 81 includes a GPS (Global Positioning System) antenna, etc. The position information Ivp includes a self-vehicle position information indicating the position of the vehicle 10 on the surface of the ground or a map, based on a GPS signal (track signal) generated by a GPS satellite.

The drive assist setting switches 82 include a cruise switch for executing cruise control, switch for setting the vehicle speed under the cruise control, switch for setting the inter-vehicle distance to a preceding vehicle under the cruise control, switch for executing lane keeping control under which the vehicle travels while staying in a set lane, automatic parking selection switch for executing automatic parking control AP, and so forth.

The navigation system 83 is a known navigation system having a display, speaker, etc. The navigation system 83 specifies the position of the self-vehicle on map data stored in advance, based on the position information Ivp. The navigation system 83 displays the self-vehicle position on a map displayed on the display. When a destination is entered, the navigation system 83 computes a traveling route from a departure place to the destination, and indicates the traveling route, etc. to the driver, via the display, speaker, or the like. The navigation information Inavi includes map information, such as road information and facility information, based on map data stored in advance in the navigation system 83, for example. The road information includes the types of roads, such as a city road, suburban road, mountain road, and automobile expressway, or expressway, and information, such as branching or joining of roads, gradients of roads, and speed limits. The facility information includes the types, locations, names, etc. of places, such as supermarkets, shops, restaurants, parking places, parks, place where the vehicle 10 is repaired, home, and service areas on expressways. The service areas are places having equipment for parking, dining, refueling, etc., on expressways. The navigation system 83 may function as an information imparting device that displays the vehicle vicinity information Iard, etc. on the display, or gives virtual and/or auditory alarm or notice to the driver.

The operating positions POSsh of the shift lever 85 include P, R, N, D operating positions, for example. The P operating position is a parking operating position for selecting a P position of the power transmission system 16 in which the power transmission system 16 is placed in a neutral state, and the output shaft 30 is non-rotatably and mechanically fixed. The neutral state of the power transmission system 16 is established when the first clutch C1, first brake B1, and second clutch C2 are all released, for example. Namely, neither of the first power transmission path PT1 and the second power transmission path PT2 is formed when the power transmission system 16 is in the neutral state. The R operating position is a reverse-drive operating position for selecting an R position of the power transmission system 16 in which the vehicle can travel backward in the gear traveling mode. The N operating position is a neutral operating position for selecting the N position of the power transmission system 16 in which the power transmission system 16 is placed in the neutral state. The D operating position is a forward-drive operating position for selecting a D position of the power transmission system 16 in which the vehicle can travel forward in the gear traveling mode, or the vehicle can travel forward while performing automatic shift control of the CVT 24 in the belt traveling mode.

The wheel brake device 86 is a brake device that applies braking force Fb produced by the wheel brakes, to the wheels. The wheel brake device 86 supplies brake hydraulic pressures to wheel cylinders provided in the wheel brakes, according to the driver's depressing operation on the brake pedal, for example. In the wheel brake device 86, in normal times, a master cylinder pressure generated from a brake master cylinder and having a magnitude corresponding to the brake operation amount Bra is supplied as a brake hydraulic pressure to the wheel cylinders. In the meantime, when the wheel brake device 86 is operating under ABS control, skidding prevention control, vehicle speed control, or automatic parking control AP, for example, brake hydraulic pressures required under each control are supplied to the wheel cylinders, for generation of the braking force Fb by the wheel brakes. The above-mentioned wheels are the drive wheel 14 and driven wheels (not shown).

The steering device 88 applies assist torque corresponding to the vehicle speed V, steering angle θsw and steering direction Dsw, yaw rate Ryaw, etc., to a steering system of the vehicle 10. In the steering device 88, torque for controlling turning of the front wheels is applied to the steering system of the vehicle 10, during execution of the automatic parking control AP, for example.

The electronic control unit 90 includes a computing unit 92, driving controller 94, engine controller 96, and shift controller 98, for implementing various controls on the vehicle 10.

The computing unit 92 calculates driver requested driving force Fddemd as driving force Fddem requested by the driver to be produced by the vehicle 10, by applying the accelerator operation amount θacc and the vehicle speed V, to a driving force map as a predetermined relationship obtained by experiment or design in advance and stored, for example.

The driving controller 94 performs drive assist control to assist the driver in driving the vehicle 10, by automatically performing at least one of acceleration or deceleration, braking, steering, and so force, without depending on driving operation of the driver. The drive assist control includes, for example, automatic vehicle speed control for controlling the vehicle speed V with no regard to the accelerator operation amount θacc, and automatic parking control AP for automatically parking the vehicle 10 at a target parking position VPptgt. The driving controller 94 includes, for example, an automatic vehicle speed controller 94a, an automatic parking controller 94b, and so forth. The automatic vehicle speed controller 94a performs the automatic vehicle speed control. The automatic vehicle speed control may be known cruise control for controlling the driving force Fd so that the vehicle speed V follows a target vehicle speed Vtgt set by the driver, for example. Or the automatic vehicle speed control may be known automatic speed limit control (ASL (Adjustable Speed Limiter)) for controlling the driving force Fd so that the vehicle speed V does not exceed a target vehicle speed Vtgt set by the driver. The automatic vehicle speed controller 94a calculates other-system requested driving force Fddemv requested under the automatic vehicle speed control. The automatic parking controller 94b executes the automatic parking control AP, by setting the target parking position VPptgt, and automatically controlling the vehicle speed V, steering, etc. The automatic parking control AP may include control for automatically operating the vehicle 10 parked under the automatic parking control AP to leave the parking place upon departure from the place. The automatic parking controller 94b calculates other-system requested driving force Fddemp requested under the automatic parking control AP. Thus, the driving controller 94 calculates other-system requested driving force Fddemsys as driving force Fddem requested under the drive assist control for assisting the driver in driving the vehicle.

The computing unit 92 determines which of the requested driving forces Fddem, i.e., which of the driver requested driving force Fddemd and the other-system requested driving force Fddemsys, is prioritized, according to a predetermined driving force coordination procedure, and sets the requested driving force Fddem thus selected, as post-coordination requested driving force Fddema. The driving force coordination procedure is determined so as to select the maximum, from the driver requested driving force Fddemd and the other-system requested driving force Fddemv under cruise control, for example. Also, the driving force coordination procedure is determined so as to select the minimum, from the driver requested driving force Fddemd and the other-system requested driving force Fddemv under the ASL. Also, the driving force coordination procedure is determined so as to prioritize the driver requested driving force Fddemd, out of the driver requested driving force Fddemd and the other-system requested driving force Fddemp upon departure from the parking place under the automatic parking control AP, at the time of overriding by the driver through the driver's accelerating operation, such as accelerator-ON.

The computing unit 92 calculates required engine torque Tedem required of the engine 12 so as to achieve the post-coordination requested driving force Fddema, using a predetermined equation (1) below, for example. In Eq. (1), "F" is the driving force Fd produced at the drive wheels 14, and "rw" is the dynamic loaded radius of tires of the drive wheels 14, while "γ" is the speed ratio γcvt of the CVT 24 or the speed ratio EL (=γgear) of the gear mechanism 28, "i" is the speed reduction ratio of the reduction gear device 34, differential gear unit 38, etc., and "t" is the torque ratio (=turbine torque Tt/pump torque Tp) of the torque converter 20. The torque ratio "t" is a function of the speed ratio "e" (=turbine speed Nt/pump speed Np) of the torque converter 20, and is calculated by applying the actual speed ratio "e" to a predetermined relationship between the speed ratio "e" and the torque ratio "t". The turbine speed Nt is the input shaft speed Nin, and the pump speed Np is the engine speed Ne. "Te" is the engine torque, and is obtained as requested engine torque Tedem, by substituting the post-coordination requested driving force Fddema into "F". The computing unit 92 calculates the required engine torque Tedem, through predetermined torque computation, such as that indicated by Eq. (1) below, based on the speed ratio of the power transmission system 16.

$$Te=(F\times rw)/(\gamma \times i \times t) \quad (1)$$

The engine controller 96 calculates a target throttle opening θthtgt that provides the required engine torque Tedem, using a predetermined engine torque map, for example. The engine controller 96 outputs an engine control command signal Se for making the actual throttle opening θth equal to the target throttle opening θthtgt, and controlling an injection signal and an ignition timing signal, to the engine control unit 44, so that the required engine torque Tedem is obtained.

The computing unit 92 calculates estimated engine torque Teest as an estimated value of the engine torque Te at the actual throttle opening θth and the engine speed Ne, using the predetermined engine torque map, for example. The computing unit 92 calculates estimated driving force Fdest as an estimated value of the driving force Fd, using a predetermined equation (2) below, for example. In Eq. (2), "Te", "t", "γ", "i", "rw", and "F" are identical with those of Eq. (1) above. "F" represents the estimated driving force Fdest when the estimated engine torque Teest is substituted for "Te". The computing unit 92 calculates the estimated driving force Fdest, through given driving force computation as indicated by Eq. (2), based on the speed ratio of the power transmission system 16.

$$F=Te\times t\times \gamma \times i/rw \quad (2)$$

The automatic parking controller 94b sets a target vehicle speed Vtgt, based on the estimated driving force Fdest, and the remaining distance from the current position of the vehicle 10 to the target parking position VPptgt, for example. The automatic parking controller 94b calculates needed braking force Fbn as braking force Fb provided by the wheel brakes and needed for achieving the target vehicle speed Vtgt, and outputs a brake control command signal Sbra for obtaining the needed braking force Fbn, to the wheel brake device 86. As a result, the vehicle 10 is able to approach the target parking position VPptgt at the vehicle speed V determined by a combination of the estimated driving force Fdest and the needed braking force Fbn. Thus, the automatic parking controller 94b performs the automatic parking control AP using the estimated driving force Fdest. In this embodiment, a shift-by-wire system is not adopted for switching of the shift position of the power transmission system 16; therefore, the shift lever 85 needs to be operated by the driver, for switching between forward travel and reverse travel of the vehicle 10 under the automatic parking control AP. Where the shift-by-wire system is adopted for switching of the shift position of the power transmission system 16, switching between forward travel and reverse travel of the vehicle 10 under the automatic parking control AP can also be automatically performed.

When the operating position POSsh is the P operating position or N operating position while the vehicle is stopped, the shift controller 98 outputs the hydraulic control command signal Scbd for engaging the dog clutch D1, to the hydraulic control circuit 42, to prepare for transition to the gear traveling mode. When the operating position POSsh is changed from the P operating position or N operating position to the D operating position while the vehicle is stopped, the shift controller 98 outputs the hydraulic control command signal Scbd for engaging the first clutch C1, to the hydraulic control circuit 42. As a result, the traveling mode is shifted to the gear traveling mode that permits the vehicle to travel forward. When the operating position POSsh is changed from the P operating position or N operating position to the R operating position while the vehicle is stopped, the shift controller 98 outputs the hydraulic control command signal Scbd for engaging the first brake B1, to the hydraulic control circuit 42. As a result, the traveling mode is shifted to the gear traveling mode that permits the vehicle to travel backward.

When the operating position POSsh is the D operating position, the shift controller 98 performs switching control for switching the traveling mode between the gear traveling mode and the belt traveling mode. More specifically, the shift controller 98 determines whether a shift is needed, by applying the vehicle speed V and the accelerator operation amount θacc, to an upshift line and a downshift line in a stepped shift map as a predetermined relationship, which has a given hysteresis for switching between a first-speed position corresponding to the speed ratio EL of the gear mechanism 28 in the gear traveling mode, and a second-speed position corresponding the lowest-side speed ratio γmax of the CVT 24 in the belt traveling mode. Then, the shift controller 98 switches the traveling mode, based on the result of the determination. Thus, the shift controller 98 switches the traveling mode between the gear traveling mode and the belt traveling mode, based on traveling conditions of the vehicle 10.

When the shift controller 98 determines an upshift during traveling in the gear traveling mode, and switches the traveling mode to the belt traveling mode, it outputs the hydraulic control command signal Scbd for effecting clutch to cutch shifting to release the first clutch C1 and engage the second clutch C2, to the hydraulic control circuit 42, while the dog clutch D1 is in the engaged state. Thus, the shift controller 98 executes the upshift, or stepped upshift, of the power transmission system 16 for switching from the gear traveling mode to the belt traveling mode, through stepped shift control involving release of the first clutch C1 and engagement of the second clutch C2.

When the shift controller 98 determines a downshift during traveling in the belt traveling mode, and switches the traveling mode to the gear traveling mode, it outputs the hydraulic control command signal Scbd for performing clutch to clutch shifting to release the second clutch C2 and engage the first clutch C1, to the hydraulic control circuit 42, while the dog clutch D1 is in the engaged state. Thus, the shift controller 98 executes the downshift, or stepped downshift, of the power transmission system 16 for switching from the belt traveling mode to the gear traveling mode, through stepped shift control involving release of the second clutch C2 and engagement of the first clutch C1.

The traveling mode can be switched between the gear traveling mode and the belt traveling mode, merely through transfer of torque due to the clutch to clutch shifting while the dog clutch D1 is in the engaged state; therefore, switching shock is reduced. In this embodiment, switching control for switching between the gear traveling mode and the belt traveling mode is called "clutch to clutch shift control" or "C to C shift control". Thus, the shift controller 98 switches the traveling mode between the gear traveling mode and the belt traveling mode, through clutch to clutch shifting for releasing one of the first clutch C1 and the second clutch C2 and engaging the other.

As the temperature of the hydraulic oil OIL is lower, the response of the hydraulic pressure is poorer, and thus, the response of the hydraulic pressure in the C to C shift control by the shift controller 98 is more likely to be unstable. Thus, when the hydraulic oil temperature THoil is lower than a given oil temperature THoilfx, the shift controller 98 restricts the clutch to clutch shifting for switching between the gear traveling mode and the belt traveling mode. The shift controller 98 restricts the clutch to clutch shifting by inhibiting the clutch to clutch shifting. The given oil temperature THoilfx is a predetermined threshold value used for determining that the hydraulic oil temperature THoil is within a range of extremely low oil temperatures, in which the clutch to clutch shifting needs to be restricted.

The shift controller 98 outputs the hydraulic control command signal Scbd for engaging the dog clutch D1, to the hydraulic control circuit 42, after startup of the engine 12 is completed, for example. When the vehicle speed V increases in the belt traveling mode after stepped upshift, the shift controller 98 outputs the hydraulic control command signal for releasing the dog clutch D1, to the hydraulic control circuit 42. On the other hand, when the vehicle speed V decreases in the belt traveling mode after the dog clutch D1 is released, the shift controller 98 outputs the hydraulic control command signal Scbd for engaging the dog clutch D1, to the hydraulic control circuit 42. Namely, while the vehicle is traveling in the belt traveling mode, the shift controller 98 places the dog clutch D1 in the released state in a vehicle speed region that exceeds a given vehicle speed Vfx, and places the dog clutch D1 in the engaged state in a vehicle speed region where the vehicle speed V is equal to or lower than the given vehicle speed Vfx. The given vehicle speed Vfx is the upper-limit vehicle speed in a predetermined low-vehicle-speed region or middle-vehicle-speed region in which it is appropriate to keep the dog clutch D1 in the engaged state, in preparation for stepped downshift, for example. With the given vehicle speed Vfx thus set, dragging of the gear mechanism 28, etc. is prevented, and the speeds of rotation of constituent members of the gear mechanism 28 and planetary gear unit 27 are prevented from being increased, while the vehicle is traveling in the belt traveling mode in the high-vehicle-speed region.

In the belt traveling mode, the shift controller 98 outputs the hydraulic control command signal Scvt for controlling the primary pressure Ppri and the secondary pressure Psec, to the hydraulic control circuit 42, for change of the speed ratio of the CVT 24, so as to achieve the target speed ratio γcvttgt of the CVT 24, while preventing belt slipping in the CVT 24.

More specifically, the shift controller 98 calculates a target primary rotational speed Npritgt, by applying the accelerator operation amount θacc and the vehicle speed V to a CVT shift map as a predetermined relationship, for example. The shift controller 98 calculates a target speed ratio γcvttgt (=Npritgt/Nsec), based on the target primary rotational speed Npritgt. The shift controller 98 calculates estimated turbine torque Ttest (=Teest×t, where "t" is the torque ratio of the torque converter 20), based on the estimated engine torque Teest. The turbine torque Tt is torque applied to the CVT 24. The shift controller 98 calculates the thrust ratio τ that achieves the target speed ratio γcvttgt, based on the target speed ratio γcvttgt and the estimated turbine torque Ttest, using a thrust ratio map as a predetermined relationship. The shift controller 98 calculates target primary thrust Wpritgt and target secondary thrust Wsectgt for achieving the thrust ratio τ. The shift controller 98 converts the target primary thrust Wpritgt and target secondary thrust Wsectgt, into a target primary pressure Ppritgt (=Wpritgt/pressure-receiving area) and a target secondary pressure Psectgt (=Wsectgt/pressure-receiving area), respectively. The shift controller 98 outputs the hydraulic control command signal Scvt for controlling the primary pressure Ppri and the secondary pressure Psec, to the hydraulic control circuit 42, so as to provide the target primary pressure Ppritgt and the target secondary pressure Psectgt. In the above description of the shift control of the CVT 24, thrust force for keeping the target speed ratio γcvttgt constant has been described, for the sake of convenience. In a transient period of shifting of the CVT 24, thrust for achieving a target upshift or target downshift is added to the thrust for keeping the target speed ratio γcvttgt constant.

When the vehicle speed V is controlled with the braking force Fb in a low-vehicle-speed region, as is the case for the automatic parking control AP, it is necessary to accurately calculate the needed braking force Fbn for obtaining the target vehicle speed Vtgt. To this end, under the automatic parking control AP, the estimated driving force Fdest needs to be computed with high accuracy. Under the automatic parking control AP, the engine 12 is operated at the idling speed, for example, and thus the driving force Fd generated is small; therefore, the accuracy in computation of the estimated driving force Fdest needs to be increased. If the estimated driving force Fdest is not calculated with high accuracy when the automatic parking control AP is performed, the vehicle 10 may not be stopped at the target parking position VPptgt, for example, thus causing a problem in the controllability of the automatic parking control AP. Thus, in order to enhance the accuracy in computation of the estimated driving force Fdest, the computing unit 92 calculates the estimated driving force Fdest, in view of the inertia loss and transmission efficiency of the power transmission system 16, for example.

More specifically, when the automatic parking control AP is performed, the computing unit 92 calculates the required engine torque Tedem, using a predetermined equation (3) below, in place of Eq. (1) above. Also, when the automatic parking control AP is performed, the computing unit 92 calculates the estimated driving force Fdest, using a predetermined equation (4) below, in place of Eq. (2) above. In Eq. (3) and Eq. (4) below, "Te", "t", "γ", "i", "rw", and "F" are identical with those of Eq. (1) and Eq. (2) above. "Tloss1" denotes first-axis inertia loss torque, namely, inertia loss torque Tloss generated in the input shaft 22. The first-axis inertia loss torque Tloss1 is a value obtained by multiplying the inertia moment of the input shaft 22, by the rate of change of the input shaft speed Nin with time, or the angular acceleration of the input shaft 22. "Tloss2" denotes second-axis inertia loss torque, namely, inertia loss torque Tloss generated in the output shaft 30. The second-axis inertia low torque Tloss2 is a value obtained by multiplying the inertia moment of the output shaft 30, by the rate of change of the output shaft speed Nout with time, or the angular acceleration of the output shaft 30. In Eq. (3) and Eq. (4), "ηpt" is the transmission efficiency in the power transmission path PT between the input shaft 22 and the output shaft 30. The transmission efficiency ηpt when the vehicle is in the gear traveling mode is a transmission efficiency ηpt1 on the first power transmission path PT1. The transmission efficiency ηpt when the vehicle is in the belt traveling mode is a transmission efficiency ηpt2 on the second power transmission path PT2. Thus, during execution of the automatic parking control AP, the computing unit 92 calculates the required engine torque Tedem, in view of the inertia loss torque Tloss as an inertia loss that appears in the power transmission system 16, and the transmission efficiency ηpt in the power transmission system 16. Also, during execution of the automatic parking control AP, the computing unit 92 calculates the estimated driving force Fdest, in view of the inertia loss torque Tloss and the transmission efficiency ηpt.

$$Te=(((F \times rw/i + Tloss2)/\eta pt/\gamma) + Tloss1)/t \quad (3)$$

$$F=(((Text) - Tloss1) \times \eta pt \times \gamma - Tloss2) \times i/rw \quad (4)$$

In the belt traveling mode, the speed ratio of the CVT 24 is continuously changed; therefore, a delay may arise in response of the actual speed ratio γcvt to the target speed ratio γcvttgt. Thus, if the estimated driving force Fdest is calculated in view of the inertia loss torque Tloss and the transmission efficiency ηpt, a closed loop structure is formed between the estimated driving force Fdest calculated with a response delay, and the needed braking force Fbn calculated based on the estimated driving force Fdest, namely, the target driving force during the automatic parking control AP, and a problem may occur in the stability of coordination of the driving force. Thus, when the estimated driving force Fdest is calculated in view of the inertia loss torque Tloss and the transmission efficiency ηpt, the shift controller 98 fixes the speed ratio on the power transmission path PT between the input shaft 22 and the output shaft 30, so as to remove an unstable element caused by continuous change of the speed ratio.

More specifically, during execution of the automatic parking control AP, the shift controller 98 fixes the traveling mode to the gear traveling mode, or fixes the traveling mode to the belt traveling mode and fixes the speed ratio γcvt of the CVT 24 to a given low-vehicle-speed side speed ratio, so that the speed ratio on the power transmission path PT is fixed. The given low-vehicle-speed side speed ratio is a low-side speed ratio γcvt at which the driving force Fd that permits execution of the automatic parking control AP can be generated, for example, the lowest-side speed ratio γmax.

However, in the case where the traveling mode is fixed to the gear traveling mode during execution of the automatic parking control AP, if the hydraulic oil temperature THoil is an extremely low oil temperature that is lower than a given oil temperature THoilfx, after cancellation of the automatic parking control AP, C to C shift control for switching from the gear traveling mode to the belt traveling mode cannot be performed. Thus, when the traveling mode is fixed to the gear traveling mode during execution of the automatic parking control AP when the hydraulic oil temperature THoil is an extremely low oil temperature, the vehicle may not be able to travel in the belt traveling mode, until the hydraulic oil temperature THoil becomes equal to or higher than the given oil temperature THoilfx, and the drivability may deteriorate. On one hand, since the vehicle travels at a low vehicle speed, during execution of the automatic parking control AP, a wide range of the driving force Fd is realized, in the gear traveling mode in which the lower-side speed ratio than that in the belt traveling mode is formed. On the other hand, when the hydraulic oil temperature THoil is an extremely low oil temperature, it may be considered to inhibit the automatic parking control; however, it is desirable, in view of situations where the control is utilized in the market, that the automatic parking control AP is carried out even when the hydraulic oil temperature THoil is an extremely low oil temperature.

FIG. 2 is a table indicating the traveling mode and the method of calculating the estimated driving force Fdest, for each control mode, which table is plotted for the purpose of curbing reduction of the drivability and reduction of the controllability of the automatic parking control AP. In FIG. 2, "NORMAL CONTROL" in the column of the control mode is control other than the automatic parking control AP, and control performed while the automatic parking control AP is not being executed. Also, "ORDINARY TEMPERATURE" in the column of the hydraulic oil temperature THoil is a hydraulic oil temperature THoil that lies in a region higher than a region of extremely low oil temperatures.

When the control mode is the automatic parking control AP, the estimated driving force Fdest is computed, in view of the inertia loss torque Tloss and the transmission efficiency ηpt. When the control mode is the normal control, it is not necessary to enhance the accuracy in computation of the estimated driving force Fdest, as compared with the automatic parking control AP, and the speed ratio of the power transmission path PT may be changed. Thus, when the control mode is the normal control, the inertia loss torque Tloss and the transmission efficiency ηpt are not taken into consideration, in computation of the estimated driving force Fdest. When the automatic parking control AP is not being executed, the computing unit 92 calculates the required engine torque Tedem, without taking account of the inertia loss torque Tloss and the transmission efficiency ηpt. Also, when the automatic parking control AP is not being executed, the computing unit 92 calculates the estimated driving force Fdest, without taking account of the inertia loss torque Tloss and the transmission efficiency ηpt.

When the control mode is the normal control, and the hydraulic oil temperature THoil is an ordinary temperature, the gear traveling mode or the belt traveling mode is used as the traveling mode, and switching control for switching between the gear traveling mode and the belt traveling mode is performed according to traveling conditions of the vehicle 10. When the hydraulic oil temperature THoil is an extremely low oil temperature, clutch to clutch shifting for switching between the gear traveling mode and the belt traveling mode is restricted. Thus, when the control mode is the normal control, and the hydraulic oil temperature THoil is an extremely low oil temperature, the traveling mode is fixed to the belt traveling mode, in view of the traveling performance at middle vehicle speeds and high vehicle speeds, and the speed ratio of the CVT 24 is changed according to traveling conditions of the vehicle 10.

When the control mode is the automatic parking control AP, the inertia loss torque Tloss and the transmission efficiency ηapt are taken into consideration, in order to enhance the computation accuracy of the estimated driving force Fdest, and the speed ratio of the power transmission path PT is fixed, so that an unstable element due to continuous change of the speed ratio is removed. When the hydraulic oil temperature THoil is an ordinary temperature, clutch to clutch shifting for switching between the gear traveling mode and the belt traveling mode is not restricted. Accordingly, when the control mode is the automatic parking control AP, and the hydraulic oil temperature THoil is an ordinary temperature, the traveling mode is fixed to the gear traveling mode, in which the response of the driving force Fd is high, and a wide range of the driving force Fd is realized. On the other hand, when the hydraulic oil temperature THoil is an extremely low oil temperature, clutch to clutch shifting for switching between the gear traveling mode and the belt traveling mode is restricted. Thus, when the control mode is the automatic parking control AP, and the hydraulic oil temperature THoil is an extremely low oil temperature, the traveling mode is fixed to the belt traveling mode, and further, the speed ratio γcv of the CVT 24 is fixed to the given low-vehicle-speed side speed ratio, e.g., the lowest-side speed ratio γmax. With this arrangement, when the vehicle 10 parked under the automatic parking control AP departs from the parking place, and the automatic parking control AP is replaced with or followed by the normal control, upon overriding due to the accelerating operation by the driver while the operating position is still the D operating position, the control can be smoothly shifted to the traveling mode in the case where the control mode is the normal control and the hydraulic oil temperature THoil is an extremely low oil temperature, namely, the traveling mode that is fixed to the belt traveling mode without fixing the speed ratio γcvt, without going through the C to C shift control for switching from the gear traveling mode to the belt traveling mode.

The electronic control unit 90 further includes a state determining unit 99, so as to achieve functions of curbing reduction of the drivability and reduction of the controllability when the automatic parking control AP is performed.

The state determining unit 99 determines whether the automatic parking function is ON (activated), namely, whether the automatic parking control AP is being executed by the automatic parking controller 94b. Also, the state determining unit 99 determines whether the hydraulic oil temperature THoil is an extremely low oil temperature that is lower than the given oil temperature THoilfx.

When the state determining unit 99 determines that the automatic parking function is ON, the computing unit 92 computes the estimated driving force Fdest while taking account of the inertia loss torque Tloss and the transmission efficiency ηpt. When the state determining unit 99 determines that the automatic parking function is not ON, namely, when the automatic parking control AP is not being executed, the computing unit 92 computes the estimated driving force Fdest without taking account of the inertia loss torque Tloss and the transmission efficiency ηpt.

When the state determining unit 99 determines that the automatic parking function is ON, and determines that the hydraulic oil temperature THoil is an extremely low oil temperature, the shift controller 98 fixes the traveling mode to the belt traveling mode, and fixes the speed ratio γcvt of the CVT 24 to the given low-vehicle-speed side speed ratio, such as the lowest-side speed ratio γmax. When the state determining unit 99 determines that the automatic parking function is ON, and determines that the hydraulic oil temperature THoil is not an extremely low oil temperature, namely, the hydraulic oil temperature THoil is equal to or higher than the given oil temperature THoilfx, the shift controller 98 fixes the traveling mode to the gear traveling mode.

When the state determining unit 99 determines that the automatic parking function is not ON, and determines that the hydraulic oil temperature THoil is not an extremely low oil temperature, the shift controller 98 switches the traveling mode between the gear traveling mode and the belt traveling mode, according to traveling conditions of the vehicle 10.

When the state determining unit 99 determines that the automatic parking function is not ON, and determines that the hydraulic oil temperature THoil is an extremely low oil temperature, the shift controller 98 fixes the traveling mode to the belt traveling mode, and changes the speed ratio of the CVT 24 according to traveling conditions of the vehicle 10.

FIG. 3 is a flowchart illustrating a principal part of control operation of the electronic control unit 90. A control routine in the flowchart of FIG. 3 is repeatedly executed, so as to curb reduction of the controllability of the automatic parking control AP when the automatic parking control AP is executed.

In FIG. 3, initially in step S10, the state determining unit 99 determines whether the automatic parking function is ON. When a negative decision (NO) is obtained in step S10, the shift controller 98 switches the traveling mode between the gear traveling mode and the belt traveling mode, according to traveling conditions of the vehicle 10, in step S20. However, when the hydraulic oil temperature THoil is an extremely low oil temperature, the traveling mode is fixed to the belt traveling mode, and the speed ratio of the CVT 24 is changed according to traveling conditions of the vehicle 10. Then, in step S30, the computing unit 92 computes the estimated driving force Fdest, without taking account of the inertia loss torque Tloss and the transmission efficiency ηpt. When an affirmative decision (YES) is obtained in step S10, the state determining unit 99 determines in step S40 whether the hydraulic oil temperature THoil is an extremely low oil temperature. When a negative decision (NO) is obtained in step S40, the shift controller 98 fixes the traveling mode to the gear traveling mode in step S50. Then, in step S60, the computing unit 92 computes the estimated driving force Fdest, while taking account of the inertial loss torque Tloss and the transmission efficiency ηpt. When an affirmative decision (YES) is obtained in step S40, the shift controller 98 fixes the traveling mode to the belt traveling mode, and fixes the speed ratio γcvt of the CVT 24 to the lowest-side speed ratio γmax in step S70. Then, in step S80, the computing unit 92 computes the estimated driving force Fdest while taking account of the inertia loss torque Tloss and the transmission efficiency ηpt.

As described above, according to this embodiment, the estimated driving force Fdest is calculated, in view of the inertia loss torque Tloss and the transmission efficiency ηpt, during execution of the automatic parking control AP, so that the calculation accuracy of the estimated driving force Fdest is improved. In addition, during execution of the automatic parking control AP, the traveling mode is set to the gear traveling mode, or the traveling mode is set to the belt traveling mode and the speed ratio γcvt of the CVT 24 is fixed to the lowest-side speed ratio γmax; therefore, when the estimated driving force Fdest used for the automatic parking control AP is computed, in view of the inertia loss torque Tloss and the transmission efficiency ηpt, an unstable element caused by continuous change of the speed ratio is removed. Namely, during execution of the automatic parking control AP, the estimated driving force Fdest used for the automatic parking control AP is calculated, in a situation where the speed ratio on the power transmission path PT between the input shaft 22 and the output shaft 30 is fixed. Thus, continuous change of the speed ratio, which may become a factor of the unstable element when the inertia loss torque Tloss and the transmission efficiency ηpt are taken into consideration, does not take place, and the calculation accuracy of the estimated driving force Fdest is improved, resulting in improvement in the controllability of the automatic parking control AP. It is thus possible to curb reduction of the controllability of the automatic parking control AP, when the automatic parking control AP is executed.

Also, according to this embodiment, when the hydraulic oil temperature THoil is lower than the given oil temperature THoilfx, during execution of the automatic parking control AP, the traveling mode is set to the belt traveling mode, and the speed ratio γcvt of the CVT 24 is fixed to the lowest-side speed ratio γmax. As a result, the driving force Fd is secured under the automatic parking control, and the vehicle is able to travel, while changing the speed ratio of the CVT 24 in the belt traveling mode, without going through clutch to clutch shifting, after cancelation of the automatic parking control AP. Also, when the hydraulic oil temperature THoil is equal to or higher than the given oil temperature THoilfx, during execution of the automatic parking control AP, the traveling mode is set to the gear traveling mode, so that the driving force Fd is more likely to be further secured under the automatic parking control AP. As a result, when the automatic parking control AP is executed, the drivability is less likely or unlikely to be reduced. Thus, the estimated driving force Fdest is calculated with improved accuracy, under each situation during execution of the automatic parking control AP, and the braking force Fb needed for feedback control of the vehicle speed V can be precisely grasped, so that the positional accuracy with which the vehicle 10 is parked at the target parking position VPptgt is improved.

According to this embodiment, while the automatic parking control AP is not being executed, the estimated driving force Fdest is calculated without taking account of the inertia loss torque Tloss and the transmission efficiency ηpt. As a result, the calculation accuracy of the estimated driving force Fdest is not improved, but the estimated driving force Fdest is stably calculated even when the speed ratio is continuously varied.

Also, according to this embodiment, the required engine torque Tedem is calculated with the inertia loss torque Tloss and the transmission efficiency ηpt taken into consideration, during execution of the automatic parking control AP, so that the calculation accuracy of the required engine torque Tedem is improved. Also, while the automatic parking control AP is not being executed, the required engine torque Tedem is calculated without taking account of the inertia loss torque Tloss and the transmission efficiency ηpt; therefore, the required engine torque Tedem is stably calculated even when the speed ratio is continuously varied.

Next, another embodiment of the present disclosure will be described. In the following description, the same reference numerals are assigned to components or units common to the embodiments, and these components or units will not be further described.

During execution of the automatic parking control AP, the hydraulic oil temperature THoil may vary. For example, during execution of the automatic parking control AP for the case where the hydraulic oil temperature THoil is an extremely low oil temperature, the hydraulic oil temperature THoil may become an ordinary temperature. In this case, the traveling mode is switched from the belt traveling mode to the gear traveling mode. As a result, during execution of the automatic parking control AP, the driving force Fd varies as the speed ratio changes due to switching of the traveling mode. In view of an influence on the vehicle speed control under the automatic parking control AP, it is desirable to prevent the driving force Fd from varying due to change of the speed ratio during execution of the automatic parking control AP. In the meantime, it is desirable to switch the traveling mode appropriately according to the hydraulic oil temperature THoil. The influence of variation of the driving force Fd due to switching of the traveling mode, on the automatic parking control AP, is avoided or reduced when the vehicle is stopped.

During execution of the automatic parking control AP, the shift controller 98 does not perform switching between the gear traveling mode and the belt traveling mode according to the hydraulic oil temperature THoil, while the vehicle speed control is being executed, namely while the vehicle is traveling, so as to avoid variation of the driving force Fd due to change of the speed ratio. On the other hand, during execution of the automatic parking control AP, the shift controller 98 performs switching between the gear traveling mode and the belt traveling mode according to the hydraulic oil temperature THoil, while the vehicle is temporarily stopped.

When the state determining unit 99 determines that the automatic parking function is ON, it determines whether forward/reverse drive switching is performed under the automatic parking control AP. The forward/reverse drive switching is switching between forward travel and reverse travel of the vehicle 10, for example. A condition where forward/reverse drive switching is performed under the automatic parking control AP corresponds to a condition where the vehicle 10 is temporarily stopped during execution of the automatic parking control AP. A condition where forward/reverse drive switching is not performed under the automatic parking control AP corresponds to a condition where the vehicle 10 is traveling during execution of the automatic parking control AP.

When the state determining unit 99 determines that forward/reverse drive switching is performed under the automatic parking control AP, it determines whether the hydraulic oil temperature THoil is lower than the given oil temperature Hoilfx.

FIG. 4 is a flowchart illustrating a principal part of control operation of the electronic control unit 90. A control routine in the flowchart of FIG. 4 is repeatedly executed, so as to curb reduction of the controllability of the automatic parking control AP when the automatic parking control AP is executed. The flowchart of FIG. 4 according to a second embodiment is different from that of FIG. 3 according to the first embodiment. Steps S10 to S80 in FIG. 4 are identical with steps S10 to S80 in FIG. 3; therefore, steps S10 to S80 in FIG. 4 will not be described herein.

In FIG. 4, in step S90 following step S60 or following step S80, the state determining unit 99 determines whether forward/reverse drive switching is performed under the automatic parking control AP. When a negative decision (NO) is obtained in step S90, the state determining unit 99 determines in step S100 whether the automatic parking function is ON. When a negative decision (NO) is obtained in step S100, step S20 and subsequent steps are executed. When an affirmative decision (YES) is obtained in step S100, the control returns to step S90. When an affirmative decision (YES) is obtained in step S90, the state determining unit 99 determines in step S110 whether the hydraulic oil temperature THoil is an extremely low oil temperature. When a negative decision (NO) is obtained in step S110, the shift controller 98 fixes the traveling mode to the gear traveling mode in step S120. Then, in step S130, the computing unit 92 computes the estimated driving force Fdest while taking account of the inertia loss torque Tloss and the transmission efficiency ηpt. When an affirmative decision (YES) is obtained in step S110, the shift controller 98 fixes the traveling mode to the belt traveling mode, and fixes the speed ratio γcvt of the CVT 24 to the lowest-side speed ratio γmax in step S140. Then, in step S150, the computing unit 92 computes the estimated driving force Fdest while taking account of the inertia loss torque Tloss and the transmission efficiency ηpt.

As described above, according to this embodiment, during execution of the automatic parking control AP, switching between the gear traveling mode and the belt traveling mode according to the hydraulic oil temperature THoil is not performed while the vehicle is traveling. On the other hand, when the vehicle is temporarily stopped, switching between the gear traveling mode and the belt traveling mode according to the hydraulic oil temperature THoil is performed. Thus, the automatic parking control AP is performed in the traveling mode appropriately established, while the influence of variation of the driving force Fd due to switching of the traveling mode, on the automatic parking control AP, is avoided or reduced.

While the embodiments of the present disclosure have been described in detail based on the drawings, the present disclosure may be applied in other forms.

In the illustrated embodiments, when the hydraulic oil temperature THoil is lower than the given oil temperature THoilfx, clutch to clutch shifting for switching the traveling mode between the gear traveling mode and the belt traveling mode is restricted. However, an applicable embodiment of the present disclosure is not limited to this arrangement. For example, the clutch to clutch shifting may be permitted, even when the hydraulic oil temperature THoil is lower than the given oil temperature THoilfx. In this case, during execution of the automatic parking control AP, the traveling mode may be fixed to the gear traveling mode, or the traveling mode may be fixed to the belt traveling mode and the speed ratio γcvt of the CVT 24 may be fixed to a given low-vehicle-speed side speed ratio, so as to establish a condition where the speed ratio on the power transmission path PT is fixed. Also, in the flowchart of FIG. 3, step S40 is not necessarily provided, and step S50 and subsequent steps or step S70 and subsequent steps may be executed when an affirmative decision (YES) is obtained in step S10. When the control mode is the normal control, the gear traveling mode and the belt traveling mode may be used as the traveling mode, irrespective of the hydraulic oil temperature THoil, and switching control between the gear traveling mode and the belt traveling mode may be performed according to traveling conditions of the vehicle 10 (see FIG. 2).

In the illustrated embodiments, under the automatic parking control AP, the accelerating operation, braking operation, and steering operation are automatically performed. However, an applicable embodiment of the present disclosure is not limited to this arrangement. For example, under the automatic parking control AP, at least the accelerating operation may be automatically performed.

In the illustrated embodiments, when the control mode is the automatic parking control AP, and the hydraulic oil temperature THoil is an extremely low oil temperature, the speed ratio γcvt of the CVT 24 is fixed to the lowest-side speed ratio γmax as the given low-vehicle-speed side speed ratio, for example. However, an applicable embodiment of the present disclosure is not limited to this arrangement. The given low-vehicle-speed side speed ratio is not required to be the lowest-side speed ratio γmax provided that the driving force Fd can be secured during the automatic parking control AP, for example.

In the illustrated embodiments, the second clutch C2 is provided on the power transmission path between the secondary pulley 64 and the output shaft 30. However, an applicable embodiment of the present disclosure is not limited to this arrangement. For example, the secondary shaft 62 may be coupled integrally with the output shaft 30, and the primary shaft 58 may be connected to the input shaft 22 via the second clutch C2. Namely, the second clutch C2 may be provided on the power transmission path between the primary pulley 60 and the input shaft 22.

In the illustrated embodiments, the gear mechanism 28 forms one gear position that provides a speed ratio that is on the lower-speed side than the lowest-side speed ratio γmax of the CVT 24. However, an applicable embodiment of the present disclosure is not limited to this arrangement. For example, the gear mechanism 28 may be arranged to form two or more gear positions having different fixed speed ratios. Namely, the gear mechanism 28 may be a stepped speed change transmission that is shifted to two or more gear positions. When the gear mechanism 28 is a stepped speed change transmission that is shifted to two or more gear positions, the gear position of the gear mechanism 28 may be fixed to any of the two or more positions, when the traveling mode is fixed to the gear traveling mode, such as when the control mode is the automatic parking control AP, and the hydraulic oil temperature THoil is an ordinary temperature.

In the illustrated embodiments, the traveling mode of the power transmission system 16 is switched, using the predetermined upshift line and downshift line. However, an applicable embodiment of the present disclosure is not limited to this arrangement. For example, the traveling mode of the power transmission system 16 may be switched by calculating the requested driving force Fddem based on the vehicle speed V and the accelerator operation amount θacc, and setting the speed ratio that can meet the requested driving force Fddem.

In the illustrated embodiments, the torque converter 20 is used as the fluid transmission device. However, an applicable embodiment of the present disclosure is not limited to this arrangement. For example, the torque converter 20 may be replaced with another type of fluid transmission device, such as a fluid coupling having no torque amplifying function. Or the fluid transmission device may not be necessarily provided. While the dog clutch D1 is provided on the first power transmission path PT1 including the gear mechanism 28, the dog clutch D1 may not be necessarily provided for practicing the present disclosure.

The embodiments as described above are mere exemplary ones, and the present disclosure may be embodied with various changes or improvements, based on the knowledge of those skilled in the art.

What is claimed is:

1. A control apparatus of a power transmission system for a vehicle, the power transmission system having a first power transmission path and a second power transmission path which are provided in parallel with each other between an input rotary member to which power of a power source is transmitted, and an output rotary member that delivers the power to drive wheels, and are respectively adapted to permit the power to be transmitted from the input rotary member to the output rotary member, the first power transmission path being formed through engagement of a hydraulic first friction engagement device, and including a stepped change gear mechanism having at least one fixed speed ratio, the second power transmission path being formed through engagement of a hydraulic second friction engagement device, and including a stepless speed change mechanism of which a speed ratio is variable, the speed ratio of the stepless speed change mechanism being on a higher side than that of the first power transmission path, the control apparatus comprising:

a processor configured to calculate an estimated value of driving force at the drive wheels, through predetermined driving force computation based on a speed ratio of the power transmission system;

set a target parking position, and execute automatic parking control for automatically parking the vehicle at the target parking position, using the estimated value of the driving force; and switch a traveling mode between a first traveling mode that permits the vehicle to travel with the power transmitted via the first power transmission path, and a second traveling mode that permits the vehicle to travel with the power transmitted via the second power transmission path, based on traveling conditions of the vehicle, wherein during execution of the automatic parking control, the processor is configured to calculate the estimated value of the driving force, while taking account of an inertia loss that appears in the power transmission system and a transmission efficiency of the power transmission system, and during execution of the automatic parking control, the processor is configured to set the traveling mode to the first traveling mode, or set the traveling mode to the second traveling mode and fix the speed ratio of the stepless speed change mechanism to a predetermined low-vehicle-speed side speed ratio.

2. The control apparatus according to claim 1, wherein:

the processor is configured to switch the traveling mode between the first traveling mode and the second traveling mode, through clutch to clutch shifting to release one of the first friction engagement device and the second friction engagement device and engage the other of the first friction engagement device and the second friction engagement device, the processor being configured to restrict the clutch to clutch shifting, when a temperature of a hydraulic oil for switching an operating state of each of the first friction engagement device and the second friction engagement device is lower than a predetermined oil temperature; and during execution of the automatic parking control, the processor is configured to set the traveling mode to the second traveling mode and fix the speed ratio of the stepless speed change mechanism to the predetermined low-vehicle-speed side speed ratio, when the temperature of the hydraulic oil is lower than the predetermined oil temperature, and is configured to set the traveling mode to the first traveling mode, when the temperature of the hydraulic oil is equal to or higher than the predetermined oil temperature.

3. The control apparatus according to claim 2, wherein, during execution of the automatic parking control, the processor is configured not to perform switching between the first traveling mode and the second traveling mode according to the temperature of the hydraulic oil while the vehicle is traveling, and is configured to perform switching between the first traveling mode and the second traveling mode according to the temperature of the hydraulic oil, when the vehicle is temporarily stopped.

4. The control apparatus according to claim 1, wherein the processor is configured to calculate the estimated value of the driving force, without taking account of the inertia loss and the transmission efficiency, while the automatic parking control is not being executed.

5. The control apparatus according to claim 1, wherein:
the processor is configured to calculate required power source torque required of the power source, through predetermined torque computation based on the speed ratio of the power transmission system; and
the processor is configured to calculate the required power source torque, while taking account of the inertia loss and the transmission efficiency, during execution of the automatic parking control, and is configured to calculate the required power source torque, without taking account of the inertia loss and the transmission efficiency, while the automatic parking control is not being executed.

* * * * *